United States Patent [19]

Skeels et al.

[11] Patent Number: 5,116,794
[45] Date of Patent: May 26, 1992

[54] METHOD FOR ENHANCING THE ACTIVITY OF ZEOLITE BETA

[75] Inventors: Gary W. Skeels, Brewster; Edith M. Flanigen, White Plains, both of N.Y.

[73] Assignee: UOP, Des Plaines, Ill.

[21] Appl. No.: 541,580

[22] Filed: Jun. 21, 1990

Related U.S. Application Data

[63] Continuation-in-part of Ser. No. 175,333, Mar. 30, 1988, abandoned, and a continuation-in-part of Ser. No. 366,264, Jun. 12, 1989, abandoned.

[51] Int. Cl.⁵ .......................... B01J 29/28; B01J 37/08
[52] U.S. Cl. .......................................... 502/85; 502/86
[58] Field of Search ............................. 502/65, 85, 86

[56] References Cited

U.S. PATENT DOCUMENTS

| | | | |
|---|---|---|---|
| Re. 28,341 | 2/1975 | Wadlinger et al. | 208/120 |
| 3,308,069 | 3/1967 | Wadlinger et al. | 252/455 |
| 4,301,316 | 11/1981 | Young | 585/455 |
| 4,428,819 | 1/1984 | Shu et al. | 208/46 |
| 4,554,065 | 11/1985 | Albinson et al. | 208/59 |
| 4,554,145 | 11/1985 | Rubin | 423/328 |
| 4,568,655 | 2/1986 | Oleck et al. | 502/66 |
| 4,612,108 | 9/1986 | Angevine et al. | 208/111 |
| 4,642,226 | 2/1987 | Calvert et al. | 423/328 |
| 4,647,368 | 3/1987 | McGuiness et al. | 208/60 |
| 4,845,063 | 7/1989 | Chu | 502/85 |
| 4,943,545 | 7/1990 | Chang et al. | 502/86 |

FOREIGN PATENT DOCUMENTS

| | | | |
|---|---|---|---|
| 0181096 | 5/1986 | European Pat. Off. . | |
| 184305 | 6/1986 | European Pat. Off. | 502/62 |
| 184461 | 6/1986 | European Pat. Off. | 502/62 |
| 0186447 | 7/1986 | European Pat. Off. . | |

Primary Examiner—Carl F. Dees
Attorney, Agent, or Firm—Thomas K. McBride; John F. Spears, Jr.; Richard E. Conser

[57] ABSTRACT

The present invention relates to methods for enhancing at least one catalytic property of a crystalline microporous three-dimensional solid catalyst having the structure and composition of zeolite beta for use in hydrocarbon conversion processes. An essential step in the methods of the present invention comprises activating the catalyst which had previously been calcined and subjected to ion-exchange with a hydrogen-forming cation by heating in air or in inert atmosphere at a temperature of from about 575°–657° C. and for a period of time sufficient to enhance at least one catalytic property of the catalyst for use in the hydrocarbon conversion process. Typical of the enhanced catalytic properties which can be achieved in accordance with the present invention are catalytic activity and catalytic selectivity. Typical hydrocarbon conversion processes wherein the zeolite beta-containing catalyst of the present invention can be used include, for example, dewaxing, hydrodewaxing, cracking, hydrocracking, alkylation, isomerization, aromatization, disproportionation and the like.

26 Claims, 3 Drawing Sheets

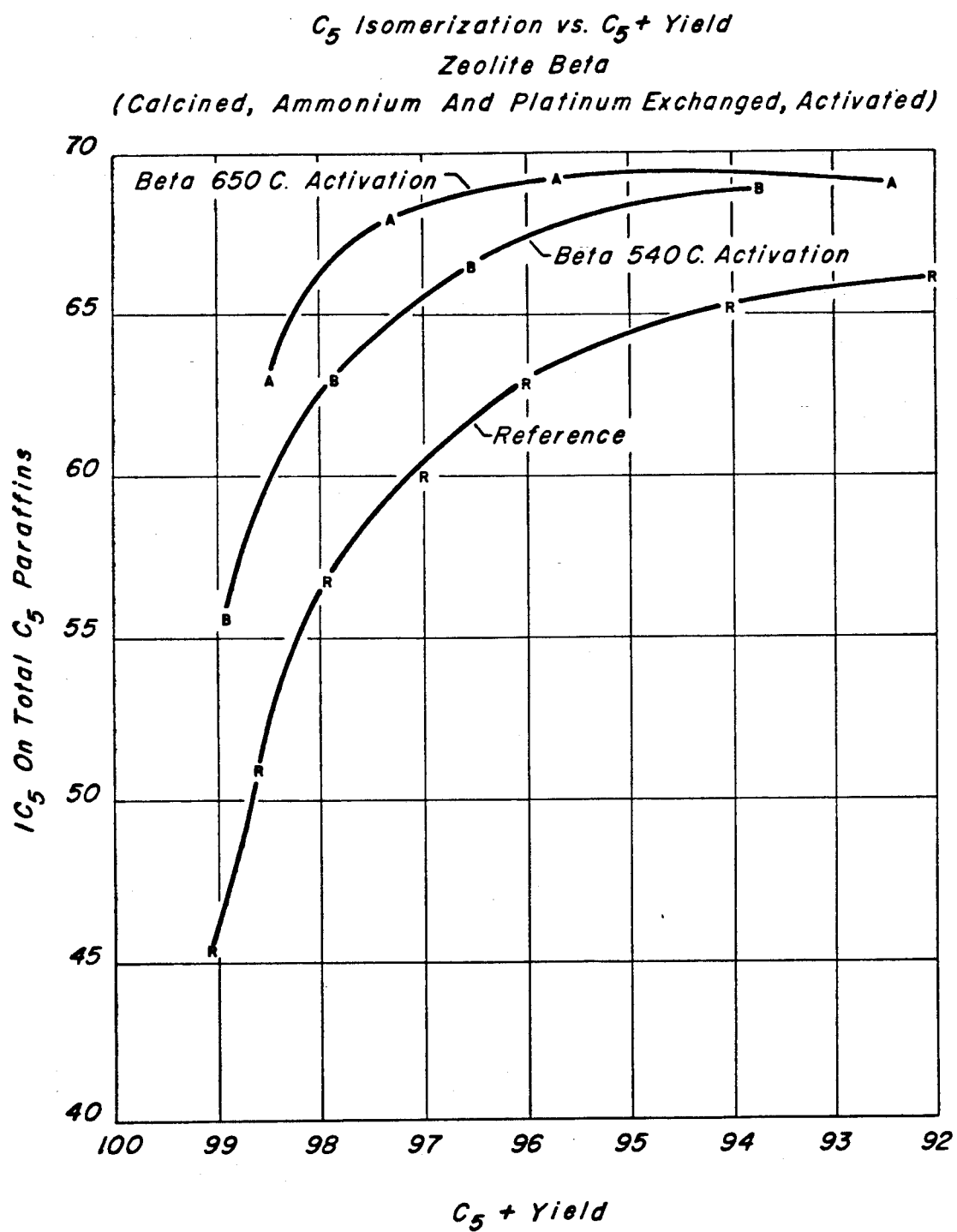

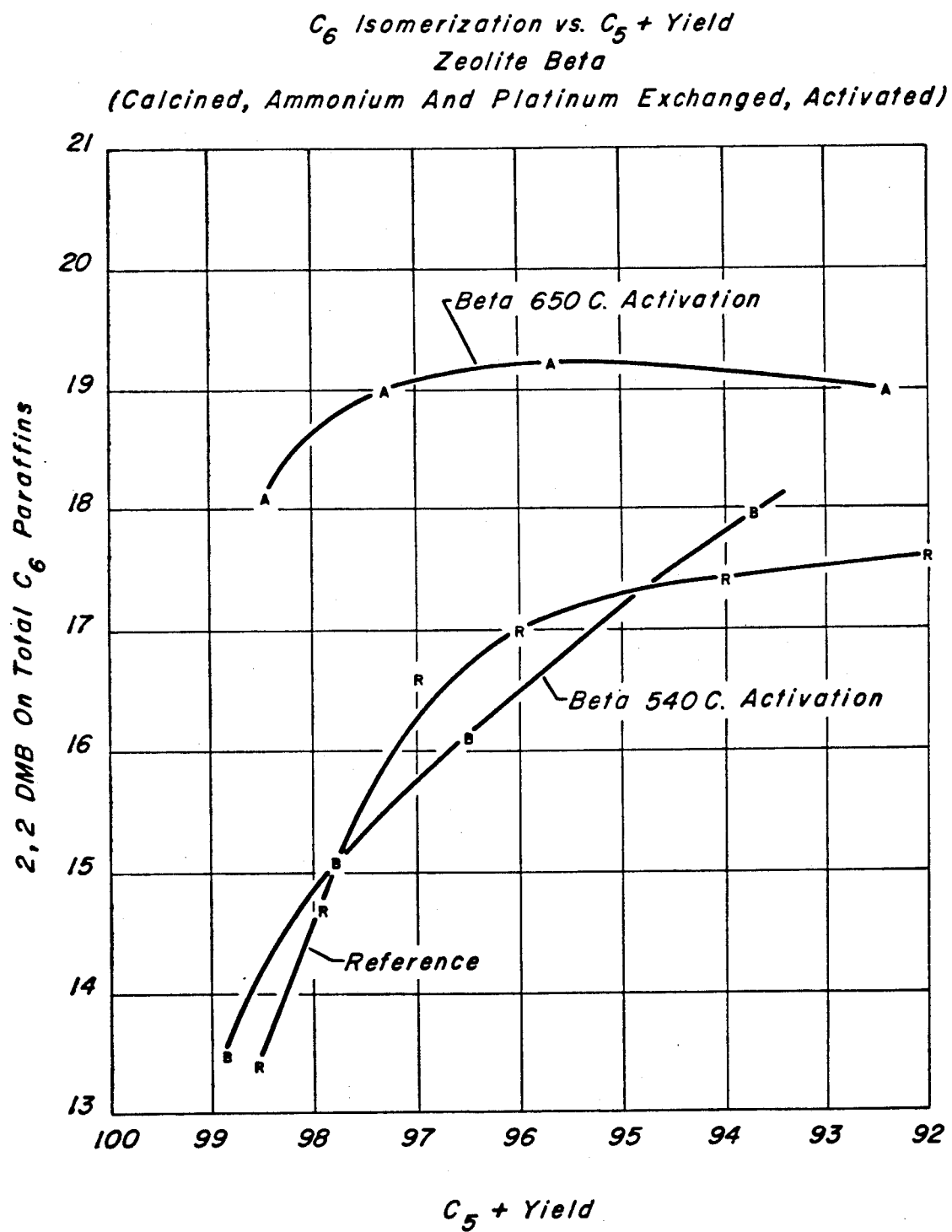

METHOD FOR ENHANCING THE ACTIVITY OF ZEOLITE BETA

CROSS-REFERENCE TO RELATED APPLICATIONS

The present application is a continuation-in-part of U.S. Ser. No. 175,333, filed Mar. 30, 1988, now abandoned and copending U.S. Ser. No. 366,264, filed Jun. 12, 1989, now abandoned.

FIELD OF THE INVENTION

This invention relates to methods for enhancing at least one catalytic property of a crystalline microporous three-dimensional solid catalyst having the structure and composition of zeolite beta for use in hydrocarbon conversion processes.

BACKGROUND OF THE INVENTION

A wide variety of hydrocarbon conversion processes encountered in the petroleum refining industry are catalytic in nature and many of these processes use crystalline aluminosilicate zeolites as catalysts. Illustrative of such processes include, for example, dewaxing, hydrodewaxing, cracking, hydrocracking, alkylation, isomerization, aromatization, disproportionation and the like. Often, the products from such hydrocarbon conversion processes, or portions thereof, are admixed as blending components to form motor fuels such as gasoline.

In these hydrocarbon conversion processes, various kinds of crystalline aluminosilicate zeolites may be used either alone or in combination with one another or with other catalytic materials. Both natural and synthetic crystalline aluminosilicate zeolites have been employed. Included among these are the type X and type Y zeolites, ZSM-5 and ZSM-20 zeolites, mordenite, as well as zeolite beta.

U.S. Pat. No. 3,308,069 and U.S. Pat. No. Re. 28,341, both issued to Wadlinger et al., disclose a method for preparing zeolite beta. The patents disclose that zeolite beta is prepared from reaction mixtures containing tetraethylammonium hydroxide as the alkali and more specifically by heating in aqueous solution a mixture of the oxides or of materials whose chemical compositions can be completely represented as mixtures of the oxides $Na_2O$, $Al_2O_3$, $[(C_2H_5)_4N]_2O$, $SiO_2$ and $H_2O$ suitably at a temperature of about 75°-200° C. until crystallization occurs. The product which crystallizes from the hot reaction mixture is separated, suitably by centrifuging or filtration, washed with water and dried. The material so obtained may be calcined by heating in air or an inert atmosphere at a temperature in the approximate range of 400°-1700° F. or higher so long as the temperature is not sufficient to destroy the crystallinity.

U.S. Pat. No. 4,642,226, issued to Calvert et al., relates to a new and improved form of crystalline silicate having the structure of zeolite beta, to a new and useful improvement in synthesizing said crystalline silicate and to use of said crystalline silicate prepared in accordance herewith as a catalyst for organic compound, e.g., hydrocarbon compound, conversion. The patent discloses the use of dibenzyldimethylammonium as a directing agent, i.e., templating agent, instead of tetraethylammonium hydroxide as described above. The patent further discloses that the zeolite beta can be ion-exchanged by conventional techniques with a salt solution. Following contact with the salt solution of the desired replacing cation, the zeolite is then preferably washed with water and dried at a temperature ranging from 65° to about 315° C. and thereafter may be calcined in air or other inert gas at temperatures ranging from about 200° to about 600° C., preferably from about 200° to about 550° C. for periods of time ranging from 1 to 48 hours or more to produce a catalytically active thermal decomposition product thereof. The patent discloses the use of zeolite beta in hydroisomerization of normal paraffins, when provided with a hydrogenation component, e.g., platinum.

U.S. Pat. No. 4,428,819, issued to Shu et al., discloses a process relating to the hydroisomerization of catalytically dewaxed lubricating oils using zeolite beta. The patent discloses that when the zeolites have been prepared in the presence of organic cations they are catalytically inactive, possibly because the intracrystalline free space is occupied by organic cations from the forming solution. It is further disclosed that the zeolites may be activated by heating in an inert atmosphere at 540° C. for one hour, for example, followed by base exchange with ammonium salts followed by calcination at 540° C. in air.

U.S. Pat. No. 4,554,145, issued to Rubin, discloses a method for the preparation of zeolite beta. In similar fashion to above cited U.S. Pat. No. 4,642,226, the patent discloses that the synthesized zeolite beta can be ion-exchanged with a salt and thereafter calcined in air or other inert gas at temperatures ranging from about 200°-550° C. for periods of time ranging from 1 to 48 hours or more to produce a catalytically active thermal decomposition product thereof. The patent discloses the use of zeolite beta in hydroisomerization of normal paraffins, when provided with a hydrogenation component, e.g., platinum.

U.S. Pat. No. 4,612,108, issued to Angevine et al., describes a hydrocracking process for feedstocks containing high boiling, waxy components using a number of sequential beds of hydrocracking catalyst based on zeolite beta. The proportion of zeolite beta in the catalyst increases in sequence so that the final bed has the highest zeolite concentration. The dewaxing activity of the zeolite beta-containing catalyst is stated to be enhanced by the use of sequential beds in this manner. The pour point of the high boiling fraction is reduced, as well as that of the distillate product, permitting part of the high boiling fraction to be included in the distillate product, thereby increasing the useful distillate yield.

U.S. Pat. No. 4,568,655, issued to Oleck et al. discloses a single catalyst system which is capable of demetalizing, hydrotreating and hydrodewaxing petroleum residue in a single stage process. The catalyst system utilized includes one or more metal oxides or sulfides of Group VIA and Group VIII of the periodic table impregnated on a base of refractory oxide material and zeolite beta. The catalyst also has about 75% of its pore volume in pores no greater than 100 Å units in diameter and about 20% of its pore volume in pores greater than about 300 Å units in diameter.

U.S. Pat. No. 4,301,316, issued to Young, relates to a process for the selective alkylation of substituted or unsubstituted benzene compounds with relatively long chain length alkylating agents to produce phenylalkanes having an improved yield of the more external phenyl isomers. The reaction can be carried out in the presence of a crystalline zeolite catalyst such as zeolite beta.

European Patent Application No. 0 186 447, issued to Mobil Oil Corporation, describes heavy hydrocarbon oils of high paraffin content that are catalytically cracked using zeolite beta. The paraffin content of the oil is at least 20 wt. % or higher. The gasoline cracking products have a high octane rating and the higher boiling products a decreased pour point resulting from the dewaxing activity of the zeolite beta.

European Patent Application No. 0 181 096, issued to Mobil Oil Corporation, discloses a hydrocracking catalyst composition which contains zeolite beta having a framework boron content of 0.1-4.0 wt. %, a solid source of alumina, and a hydrogenation component. The catalyst can be used to hydrocrack heavy hydrocarbon feeds at low pressures.

U.S. Pat. No. 4,554,065, issued to Albinson et al., relates to a process for dewaxing a hydrocarbon feedstock with a relatively high pour point and containing paraffins selected from the group of normal paraffins and slightly branched paraffins which comprises subjecting said feedstock to catalytic dewaxing at catalytic dewaxing conditions by passing said feedstock, along with hydrogen, over a dewaxing catalyst comprising zeolite beta having a noble metal hydrogenation/dehydrogenation component to produce a partially dewaxed product and subjecting said partially dewaxed product to catalytic dewaxing at catalytic dewaxing conditions by passing said partially dewaxed product over catalyst comprising zeolite beta having a base metal hydrogenation/dehydrogenation component to recover a substantially dewaxed product as a product of the process.

U.S. Pat. No. 4,647,368, issued to McGuiness et al., describes an upgrading process for paraffinic naphthas which subjects a full range naphtha to hydrocracking over a zeolite beta hydrocracking catalyst to effect a selective partial hydrocracking in which the higher molecular weight n-paraffinic components of the naphtha are hydrocracked preferentially to the lower molecular weight components with concurrent isomerization of n-paraffins to isoparaffins, to form a hydrocracked effluent which comprises isobutane, $C_5$-$C_7$ paraffins and relatively higher boiling naphthenes and paraffins. The hydrocracked effluent is split to remove the isobutane and the $C_5$ and $C_7$ paraffins with the balance of the higher boiling components being used as a reformer feed. Removal of the $C_5$ and $C_7$ paraffins permits improved reformer operation with the production of a higher octane product. The isomerization of the paraffins which occurs in the hydrocracking step provides a $C_5$-$C_7$ paraffinic fraction which is of relatively higher octane number because of the shift to isoparaffins, permitting this component to be used as a gasoline blending component.

It can be seen from the disclosures of the above cited patents that zeolite beta has been prepared for use as a catalyst in a variety of hydrocarbon conversion processes. Accordingly, methods are sought for enhancing at least one catalytic property of zeolite beta, preferably catalytic activity and selectivity. Such catalysts could be useful in hydrocarbon conversion processes such as described above, as well as many others.

SUMMARY OF THE INVENTION

The present invention relates to methods for enhancing at least one catalytic property of a crystalline microporous three-dimensional solid catalyst having the structure and composition of zeolite beta for use in hydrocarbon conversion processes.

In one aspect of the invention, a method is provided for activating a zeolite beta-containing catalyst, which had previously been calcined to remove catalyst templating agent and subjected to ion-exchange with a hydrogen forming cation, by heating in air or an inert atmosphere at a temperature of from about 575°-675° C. and for a period of time sufficient to enhance at least one catalytic property of the catalyst for use in the hydrocarbon conversion process. In this aspect of the present invention, the method is preferably performed just prior to the use in the hydrocarbon conversion process, e.g., after the catalyst is loaded in a hydrocarbon conversion reactor vessel.

In another aspect of the present invention, a method is provided for activating a zeolite beta-containing catalyst that includes the steps of (a) ion-exchanging said catalyst with a salt solution containing at least one hydrogen-forming cation other than hydronium; and (b) activating said catalyst by heating in air or an inert atmosphere at a temperature of from about 575°-675° C. and for a period of time sufficient to enhance at least one catalytic property of the catalyst in said hydrocarbon conversion process. Thus, in this aspect of the present invention, it is necessary to perform an ion-exchange step in addition to the activating step. Hence, the method can readily be performed on a catalyst that has been previously calcined to remove a catalyst templating agent that was initially present on the catalyst from the synthesis of the zeolite beta.

In still yet another aspect of the present invention there is provided an improvement in a method for enhancing at least one catalytic property of a crystalline microporous three-dimensional solid catalyst having the structure and composition of zeolite beta for use in a hydrocarbon conversion process. The basic steps of the method are intended to be performed on a catalyst that had previously been subjected to calcination by heating in air or an inert atmosphere at a temperature and for a period of time sufficient to oxidize at least a substantial portion of a catalyst templating agent initially present on the catalyst and includes the steps of: (1) ion-exchanging the catalyst with a salt solution containing at least one hydrogen-forming cation other than hydronium; and (2) activating the catalyst by heating in air or an inert atmosphere. The improvement to the method comprises; activating the catalyst in step (2) at a temperature of from about 575° to about 675° C.

Thus, Applicants have found that in order to provide enhanced catalytic properties in accordance with the present invention, it is critical to perform the activation step at a temperature of from about 575°-675° C., preferably from about 600°-675° C., and more preferably from about 625°-675° C.

BRIEF DESCRIPTION OF THE DRAWINGS

FIG. 2 graphically illustrates the relationship between isomerization and yield of pentanes in a hydrocarbon conversion process using a zeolite beta catalyst that was calcined at 600° C., ammonium-exchanged, platinum-exchanged and activated.

FIG. 3 graphically illustrates the relationship between isomerization and yield of hexanes in a hydrocarbon conversion process using a zeolite beta catalyst that was calcined at 600° C., ammonium-exchanged, platinum-exchanged and activated.

DETAILED DESCRIPTION OF THE INVENTION

Figure 1:
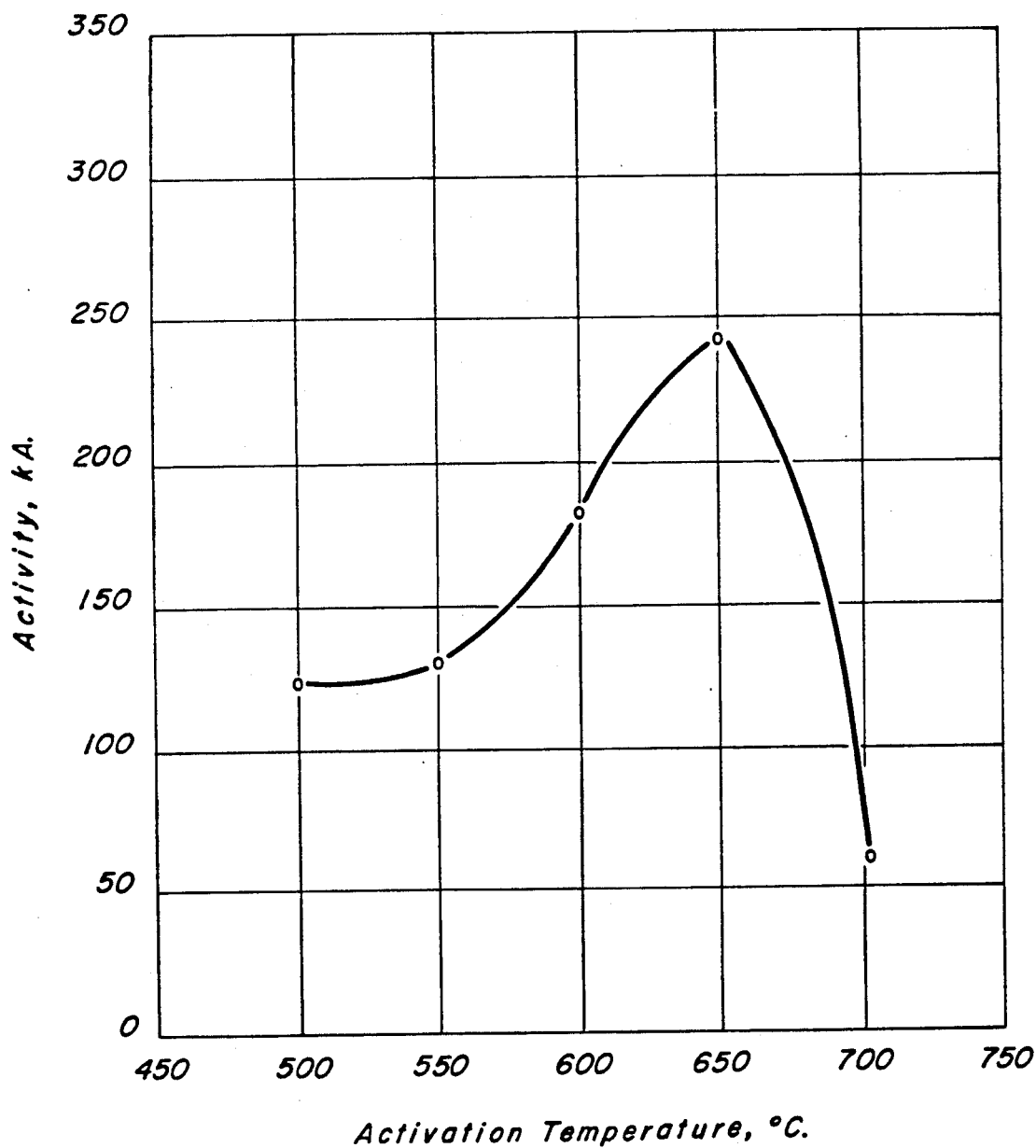
FIG. 1 graphically illustrates the relationship between catalyst cracking activity and catalyst activation temperature in a hydrocarbon conversion process using a zeolite beta catalyst that was calcined at 600° C., ammonium-exchanged and activated.

The crystalline microporous three-dimensional solids having the structure and composition of zeolite beta (hereinafter also denoted as "zeolite beta") employable in the catalyst compositions herein are conventional materials and are described, for example, in above-cited U.S. Pat. No. 3,308,069 and U.S. Pat. No. Re. 28,341 hereby incorporated by reference. Catalyst compositions for use in the hydrocarbon conversion processes described herein include zeolite beta generally in conjunction with at least one inorganic oxide matrix component as more fully described hereinafter.

The composition of zeolite beta in its as-synthesized form can be represented as follows:

$$[XNa(1.0 \pm 0.1 - X)TEA]AlO_2 YSiO_2$$

where X is less than 1, preferably less than 0.75; TEA represents the tetraethylammonium ion from the templating agent; Y is greater than 5 but less than 100. In the as-synthesized form, water of hydration may also be present in ranging amounts.

The sodium can be derived from the synthesis mixture used to prepare zeolite beta. This synthesis mixture typically contains a mixture of the oxides (or of materials whose chemical compositions can be completely represented as mixtures of the oxides) $Na_2O$, $Al_2O_3$, $[(C_2H_5)_4N]_2O$, $SiO_2$ and $H_2O$. Preferably, the mixture is held at a temperature of about 75°-200° C. until crystallization occurs. The composition of the reaction mixture expressed in terms of mole ratios, preferably falls within the following ranges:

$SiO_2/Al_2O_3$—10 to 200;
$Na_2O$/tetraethylammonium hydroxide (TEAOH)—0.0 to 0.1;
$TEAOH/SiO_2$—0.1 to 1.0; and
$H_2O/TEAOH$—20 to 75.

The product which crystallizes from the hot reaction mixture is separated, suitably by centrifuging or filtration, washed with water and dried.

The material so obtained should then be calcined by heating preferably in air or an inert atmosphere at a temperature usually within the range of from about 200° to about 1000° C. or higher, preferably from about 550° to about 750° C., more preferably from about 575° to about 675° C., and most preferably from about 600° to about 650° C., and for a period of time preferably in excess of 0.25 hours, more preferably in excess of 0.50 hours. The calcination should preferably not cause degradation of any catalytic sites in zeolite beta. This calcination oxidizes and/or decomposes at least a substantial portion of the catalyst templating agent, e.g., tetraethylammonium ions or dibenzyldimethylammonium ions when used instead, or in addition to TEA, from the catalyst templating agent, to hydrogen ions and removes the water to provide a zeolite beta that is substantially freed of templating agent. The calcined zeolite beta is also known as H-form zeolite beta. As used herein, the terms "at least a substantial portion" and "substantially freed" refer to at least 50 wt. %, preferably at least 75 wt. % and most preferably 100 wt. % oxidation and/or decomposition of the catalyst templating agent from the as-synthesized zeolite beta.

With 100 wt. % oxidation and/or decomposition of the catalyst templating agent, the formula of zeolite beta can then be depicted as follows:

$$[XNa(1.0 \pm 0.1 - X)H]AlO_2 YSiO_2$$

where X and Y are as defined above. The degree of hydration is considered to be zero following the calcination.

The H-form zeolite beta is then preferably ion-exchanged with a salt solution containing at least one hydrogen-forming cation other than hydronium, such as $NH_4^+$ or quaternary ammonium, in which sodium is replaced by the hydrogen-forming cation to give zeolite beta of the formula (anhydrous basis with $NH_4^+$ exchange):

$$[XNH_4^+(1 \pm 0.1 - X)H]AlO_2 YSiO_2$$

where X and Y are as defined above.

According to this invention, the hydrogen-forming cation-exchanged form of zeolite beta may optionally be subjected to metal cation-exchange to give a material of the formula (anhydrous basis):

$$\frac{X}{n} M(1 \pm 0.1 - X)HAlO_2 YSiO_2$$

where X and Y are as described above and n is the valence of the metal M which may be any metal.

According to this invention, the hydrogen-forming cation-exchange form of zeolite beta or the metal cation-exchange form of zeolite beta can preferably be combined with at least one inorganic oxide matrix component and thereafter activated by heating in air or an inert atmosphere at a temperature and for a period of time sufficient to enhance at least one catalytic property of the catalyst in a hydrocarbon conversion process as described hereinafter. The $SiO_2/Al_2O_3$ molar ratio of zeolite beta product employed in this invention will generally be in the range of from about 15:1 to about 45:1, preferably from about 20:1 to about 30:1; and more preferably from about 22:1 to about 26:1.

Because a templating agent such as tetraethylammonium hydroxide is used in its preparation, zeolite beta may contain occluded tetraethylammonium ions, e.g., as the hydroxide or silicate, within its pores in addition to that required by electroneutrality and indicated in the calculated formulae herein. The formulae are calculated using one equivalent of cation per aluminum atom in tetrahedral coordination in the crystal lattice.

Zeolite beta, in addition to possessing a composition as defined above, may also be characterized by its X-ray diffraction data which are set out in U.S. Pat. No. 3,308,069 and U.S. Pat. No. Re. 28,341. The significant d values (Angstroms, radiation: K alpha doublet of copper, Geiger counter spectrometer) are as shown in Table 1 below:

TABLE 1

| d Values of Reflections in Zeolite Beta |
|---|
| 11.40 + 0.2 |
| 7.40 + 0.2 |
| 6.70 + 0.2 |
| 4.25 + 0.1 |
| 3.97 + 0.1 |
| 3.00 + 0.1 |
| 2.20 + 0.1 |

As indicated above, zeolite beta is preferably ion-exchanged following calcination to remove the organic template by contacting (with or without the presence of an inorganic oxide matrix component) said zeolite beta with a salt solution of at least one hydrogen-forming cation, such as $NH_4^+$ or quaternary ammonium. Zeolite beta may optionally be metal cation-exchanged following the hydrogen-forming cation-exchange. Suitable metal cations include cations selected from the group consisting of cations of Group IIA, Group IIIA, Groups IIIB-VIIB, e.g., nickel, cobalt, iron, manganese, copper, platinum, palladium, rhodium and the like including mixtures thereof, and rare earth cations selected from cerium, lanthanum, praseodymium, neodymium, promethium, samarium, europium, gadolinium, terbium, dysprosium, holmium, erbium, thulium, ytterbium, lutetium and mixtures thereof. Of course, the metal cation present as a result of metal cation-exchange should have no substantial adverse effect on the desired hydrocarbon conversion process. As a result of such ion-exchange, the zeolite beta can contain at least one cation, e.g., hydrogen-forming cation and/or metal cation, which is different from the cations initially associated with zeolite beta as a result of its synthesis. The cation(s) present as a result of ion-exchange is preferably present in an effective amount between about 0.1 wt. % and about 20 wt. %, based on the weight of the starting zeolite beta and is typically present in an effective amount between about 0.5 wt. % and about 10 wt. %.

The ion-exchange is generally carried out by preparing a slurry of the zeolite beta catalyst by adding about 5 to 15 volumes of water per volume of catalyst, after which a solution of a selected cation is added. The ion-exchange is generally carried out at room temperature and the resulting solution is then heated to above about 50° C. and stirred at this temperature for about 0.5 to 3 hours. This mixture is then filtered and water washed to remove excess anion present as a result of the solution of the cation salt.

The zeolite beta is typically employed with at least one inorganic oxide matrix component, which combination is preferably formed after ion-exchange and prior to activation. While zeolite beta can be employed with one or more of a wide variety of inorganic oxide matrix components as hereinafter described, it is important that the pore structure of zeolite beta remain open and readily accessible to the feedstock in order to provide effective catalytic activity. Illustrative inorganic oxide matrix components which may be employed in formulating catalysts, include: amorphous catalytic inorganic oxides such as catalytically active silica/aluminas, clays, silicas, aluminas, silica-aluminas, silica-zirconias, silica-magnesias, silica-thorias, silica-berylias, silica-alumina-thorias, silica-alumina-zirconias, alumina-borias, alumina-titanias and the like and mixtures thereof. The matrix may be in the form of a sol, hydrogel or gel and is typically an alumina, silica or silica-alumina component such as a conventional silica-alumina catalyst, several types available. The matrix may itself provide a catalytic effect, such as that observed for catalytically active silica/aluminas, or it may be essentially inert. The matrix may act as a "binder" in some instances although in some instances the final catalyst may be spray dried or formed without the need of a binder.

These matrix materials may be prepared as a cogel of silica and alumina or as alumina precipitated on the preformed and preaged hydrogel. Silica may be present as a major matrix component in the solids present in the matrix, e.g., present in an amount between about 5 and about 40 wt. % and preferably between about 10 and about 30 wt. %. The silica may also be employed in the form of a cogel comprising about 75 wt. % silica and about 25 wt. % alumina or comprising about 87 wt. % silica and about 13 wt. % alumina. The inorganic oxide matrix component will typically be present in the final catalyst in an amount between about 0 and 99 wt. %, preferably between about 5 and about 90 wt. %, based on the total catalyst. It is also within the scope of the instant invention to employ other materials with the zeolite beta in the final catalysts, including clays, carbon monoxide oxidation promoters, etc.

Representative of matrix systems employable herein are disclosed in British Patent Specification No. 1,315,553, published May 2, 1973 and U.S. Pat. Nos. 3,446,727 and 4,086,187, hereby incorporated by reference.

As above-mentioned, the catalysts of the present invention may be employed with a matrix component and this may be a silica or alumina component. The alumina component may comprise discrete particles of various aluminas, e.g., pseudoboehmite. The alumina component may be in the form of discrete particles having a total surface area, as measured by the method of Brunauer, Emmett and Teller (BET), greater than about 20 square meters per gram ($M^2/g$), preferably greater than 145 $M^2/g$, for example, from about 145 to about 300 $M^2/g$. The pore volume of the alumina component will typically be greater than 0.35 cc/g. The average particle size of the alumina particles is generally less than 10 microns and preferably less than 3 microns. The alumina may be employed alone as the matrix or composited with the other matrix components.

The alumina component may be any alumina and has preferably been preformed and placed in a physical form such that its surface area and pore structure are stabilized so that when the alumina is added to an impure, inorganic gel containing considerable amount of residual soluble salts, the salts will not alter the surface and pore characteristics measurably nor will they promote chemical attack on the preformed porous alumina which could undergo change. For example, the alumina is typically an alumina which has been formed by suitable chemical reaction, the slurry aged, filtered, dried, washed free of residual salt and then heated to reduce its volatile content to less than about 15 wt. %. The alumina component may be present in the final catalyst in an amount ranging between about 5 and about 95 wt. %, preferably between about 10 and about 30 wt. % based on the total catalyst. Further, an alumina hydrosol or hydrogel or hydrous alumina slurry may be used in the catalyst preparation.

Mixtures of zeolite beta and one or more inorganic oxide matrix components may be formed into a final form for the catalyst by standard catalyst forming techniques including spray drying, pelleting, extrusion and other suitable conventional means. The use of spray drying procedures is the preferred means by which catalysts are prepared and such procedures are well known in the art. When the catalyst is formed as extruded pellets and dried in air, such are typically crushed and sized to a size less than 150 microns.

Catalysts containing zeolite beta may be prepared by any conventional method. One method of preparing such catalysts employing silica-alumina and porous alumina is to react sodium silicate with a solution of aluminum sulfate to form a silica/alumina hydrogel slurry which is then aged to give the desired pore properties, filtered to remove a considerable amount of the extraneous and undesired sodium and sulfate ions and then reslurried in water. The alumina may be prepared by reacting solutions of sodium aluminate and aluminum sulfate under suitable conditions, aging the slurry to give the desired pore properties of the alumina, filtering, drying, reslurry in water to remove sodium and sulfate ions and drying to reduce volatile matter content to less than 15 wt. %. The alumina may then be slurried in water and blended in proper amounts, with a slurry of impure silica-alumina hydrogel. The zeolite beta may then be added to this blend. A sufficient amount of each component is utilized to give the desired final composition. The resulting mixture is then filtered to remove a portion of the remaining extraneous soluble salts therefrom. The filtered mixture is then dried to produce dried solids. The dried solids are subsequently reslurried in water and washed substantially free of the undesired soluble salts. The catalyst is then dried with or without heat to a residual water content of less than about 15 wt. %. The catalyst is employed after activation as described hereinbelow.

For the purposes of this invention, it is critical that the zeolite beta catalyst be activated at a temperature of from about 575°–675° C. and for a period of time sufficient to enhance at least one catalytic property of the zeolite beta catalyst in a hydrocarbon conversion process. The activation should occur preferably immediately prior to employing the zeolite beta catalyst in a hydrocarbon conversion process, such as after the catalyst has been loaded in a reactor vessel used in the hydrocarbon conversion process.

As noted above, it is critical in order to provide the enhanced performance of the present invention that the zeolite beta catalyst be activated at a temperature of from about 575° to about 675° C. Preferred ranges within the critical range are preferably from about 600° to about 675° C., more preferably from about 625° to about 675° C., and most preferably from about 640° to about 660° C. Activation of zeolite beta catalyst at a temperature of about 650° C. is an especially preferred aspect of this invention. The activation time period is not narrowly critical and typically is in excess of 0.25 hours, preferably in excess of 0.50 hours, so long as the activation period is not sufficient to destroy the crystallinity of zeolite beta. Activation of zeolite beta catalyst for a period of about 1 hour or longer is a preferred aspect of this invention.

It is important to note that the method of the present invention can be performed on a zeolite beta-containing catalyst in any of its stages of existence beyond the as-synthesized stage. That is, the method of the present invention can be performed on zeolite beta in the as-synthesized form, calcined form or in the ion-exchanged form. Moreover, it is to be further understood that the methods of the present invention can be used to treat regenerated catalysts as well, e.g., catalysts that have been subjected to oxidative regeneration for carbon removal.

Hence, in one aspect of the present invention, the calcination step can be included in the method, along with ion-exchange and activation steps described above. Thus, the present invention can be practiced on as-synthesized zeolite beta which contains templating agent by including the calcination step in the method.

In another aspect of the present invention, it is not required that the calcination step be performed. For example, a catalyst supplier may provide zeolite beta that has been previously calcined. In such a case, the method would include the ion-exchange step and the activating step as described above.

In still yet another aspect of the present invention, it is not required to perform the ion-exchange step. This would be appropriate when the zeolite beta has already been ion-exchanged as described above and perhaps dried such as when the catalyst is ready for loading in a reactor vessel.

According to the present invention, in a process for catalytically converting a feedstock into a product, a feedstock is contacted with the activated zeolite beta catalyst in a reaction zone at conditions effective to convert the feedstock into a product.

Substantially any feedstock or combination of feedstocks may be employed in the present invention. Such feedstock, i.e., reactant component or components, may be gaseous, solid or liquid at ambient conditions, i.e., 20° C. and atmospheric pressure. The feedstock may be organic or a combination of inorganic and organic components. The present reaction system is particularly applicable to organic feedstocks, preferably having molecules comprising carbon and hydrogen, and optionally at least one other element. This other element is preferably selected from the group consisting of oxygen, sulfur, halogen, nitrogen, phosphorous and mixtures thereof, with oxygen being particularly preferred.

The product or products obtained from the feedstock/activated zeolite beta catalyst contacting will, of course, depend, for example, on the feedstock, catalyst and conditions employed. As with the feedstock, the product or products can be organic or a combination of inorganic and organic components. Preferably, the desired product is organic. However, it should be noted that a necessary, and therefore desired, reaction by-product may be inorganic even when the primary product sought is organic. This is exemplified by the conversion of methanol to light olefins plus water. The organic product or products have molecules which preferably include carbon and hydrogen. The desired product or products preferably have kinetic diameters which allow such product or products to be removed from or escape from the pores of the zeolite beta catalyst composition.

The amount of zeolite beta catalyst in the reaction zone may vary over a wide range depending, for example, on the specific processing application involved.

In addition to the feedstock, a diluent may be used in conjunction with the feedstock if desired and/or beneficial to the overall process. Such diluent may be mixed or combined with the feedstock prior to the feedstock-/activated zeolite beta catalyst contacting or it may be introduced into the reaction zone separately from the feedstock. Such diluent preferably acts to moderate the rate, and possibly also the extent, of feedstock chemical conversion and may also act to aid in temperature control. In certain embodiments, the diluent is preferably substantially continuously fed to the reaction zone during the process. Typical of the diluents which may be employed in the instant process are helium, argon, nitrogen, carbon monoxide, carbon dioxide, hydrogen, hydrocarbons and mixtures thereof. The amount of diluent employed, if any, may vary over a wide range depending on the particular application involved. For example, the amount of diluent may be in an amount in the range of about 0.1% or less to about 99% or more of the moles of feedstock.

The conditions at which the process occurs can vary widely depending, for example, on the specific feedstock and catalyst employed and on the specific product or products desired. The present process is particularly applicable with feedstock/activated zeolite beta catalyst contacting temperatures in excess of about 50° C., more preferably in excess of about 100° C., and with pressures of from about atmospheric to about 2000 psig. The residence time of the feedstock in the reaction zone may be independently selected depending, for example, on the specific feedstock and catalyst employed, and on the specific product or products desired.

Substantially any hydrocarbon conversion process which is capable of being catalyzed by a zeolite beta catalyst composition can be conducted in accordance with this invention. Illustrative of such hydrocarbon conversion processes include, for example, cracking, hydrocracking, alkylation for both the aromatic and isoparaffin types, isomerization including xylene isomerization, polymerization, reforming, hydrogenation, dehydrogenation, transalkylation, dealkylation, hydrodecyclization and dehydrocyclization.

Using activated zeolite beta catalyst compositions which contain a hydrogenation promoter such as platinum or palladium, heavy petroleum residual stocks, cyclic stocks and other hydrocrackable charge stocks can be hydrocracked at temperatures in the range of 400°–825° F. using molar ratios of hydrogen to hydrocarbon in the range of between 2 and 80, pressures between 10 and 3500 psig, and a liquid hourly space velocity (LHSV) of from 0.1 to 20, preferably 1.0 to 10.

The activated zeolite beta catalyst compositions employed in hydrocracking are also suitable for use in reforming processes in which the hydrocarbon feedstocks contact the catalyst at temperatures of from about 700°–1000° F., hydrogen pressures of from 100 to 500 psig. LHSV values in the range of 0.1 to 10 and hydrogen to hydrocarbon molar ratios in the range of 1 to 20, preferably between 4 and 12.

These same catalysts, i.e., those containing hydrogenation promoters, are also useful in hydroisomerization processes in which feedstocks containing normal paraffins in the pentane and hexane carbon range are converted to saturated branched chain isomers. Hydroisomerization is typically carried out at a temperature of from about 200°–600° F., preferably from 300°–550° F. with an LHSV value of from about 0.2 to 5.0. Hydrogen is preferably supplied to the reactor in admixture with the hydrocarbon feedstock in molar proportions (H/HC) of between 0.5 and 5.

Other isomerization reactions are carried out under conditions similar to those described above for reforming, using somewhat more acidic catalysts. Olefins are preferably isomerized at temperatures of 500°–900° F., while heavy paraffins, naphthenes and alkyl aromatics are isomerized at temperatures of 650°–1000° F. Particularly desirable isomerization reactions contemplated herein in addition to the normal paraffin isomerization described above include the conversion of n-heptene and/or n-octene to isoheptenes, and isooctenes, methylcyclopentane to cyclohexane, meta-xylene and/or ortho-xylene to paraxylene, 1-butene to 2-butene and/or isobutene, n-hexene to isohexene, cyclohexene to methylcyclopentene, etc. The preferred cation form is a combination of the activated zeolite beta with polyvalent metal compounds (such as sulfides) of metals of Group IIA, Group IIB and rare earth metals.

At somewhat higher temperatures, i.e., from about 650°–1000° F., preferably 850°–950° F. and usually at somewhat lower pressures within the range of about 15 to 50 psig, the same catalyst compositions are used to hydroisomerize feedstocks containing heavier normal paraffins. Preferably, the heavy paraffin feedstock comprises normal paraffins having a carbon number range of $C_7$–$C_{20}$. Contact time between the feedstock and the catalyst is generally relatively short in order to avoid undesirable side reactions such as olefin polymerization and paraffin cracking. LHSV values in the range of 0.1 to 10, preferably 1.0 to 6.0 are suitable.

The crystal structure of the activated zeolite beta catalysts and their availability in a form totally void of alkali metal content favor their use in the conversion of alkylaromatic compounds, particularly the catalytic disproportionation of toluene, ethylene, trimethyl benzenes, tetramethyl benzenes and the like. In the disproportionation process, isomerization and transalkylation can also occur. Group VIII noble metal adjuvants alone or in conjunction with Group VIB metals such as tungsten, molybdenum and chromium are preferably included in the catalyst composition in amounts of from about 3 to 15 wt. % of the overall composition. Extraneous hydrogen can, but need not, be present in the reaction zone which is maintained at a temperature of from about 400°–750° F., pressures in the range of 100 to 2000 psig and LHSV values in the range of 0.1 to 15.

Catalytic cracking processes are preferably carried out with activated zeolite beta compositions using feedstocks such as gas oils, heavy naphthas, deasphalted crude oil residua, etc., with gasoline being the principal desired product. Temperature conditions of 850°–1100° F., LHSV values of 0.5 to 10 and pressure conditions of from about 0 to 50 psig are suitable.

Dehydrocyclization reactions employing paraffinic hydrocarbon feedstocks, preferably normal paraffins having more than 6 carbon atoms, to form benzene, xylenes, toluene and the like are carried out using essentially the same reaction conditions as for catalytic cracking. For these reactions it is preferred to use the activated zeolite beta catalyst in conjunction with a Group VIII non-noble metal cation such as cobalt and nickel.

In catalytic dealkylation wherein it is desired to cleave paraffinic side chains from aromatic nuclei without substantially hydrogenating the ring structure, relatively high temperatures in the range of about 800°–1000° F. are employed at moderate hydrogen pressures of about 300 to 1000 psig, other conditions being similar to those described above for catalytic hydrocracking. Preferred catalysts are of the same type described above in connection with catalytic dehydrocyclization. Particularly desirable dealkylation reactions contemplated herein include the conversion of methylnaphthalene to naphthalene and toluene and/or xylenes to benzene. For dealkylation as well as alkylation processes, the activated zeolite beta compositions having pores of at least 5 Å are preferred. When employed for dealkylation of alkyl aromatics, the temperature is usually at least 350° F. and ranges up to a temperature at which substantial cracking of the feedstock or conversion products occurs, generally up to about 700° F. The temperature is preferably at least 450° F. and not greater than the critical temperature of the compound undergoing dealkylation. Pressure conditions are applied to retain at least the aromatics feed in the liquid state. For alkylation the temperature can be as low as 250° F. but is preferably at least 350° F. In alkylation of benzene, toluene and xylene, the preferred alkylating agent is selected from olefins such as ethylene and propylene.

In catalytic hydrofining, the primary objective is to promote the selective hydrodecomposition of organic sulfur and/or nitrogen compounds in the feed, without substantially affecting hydrocarbon molecules therein. For this purpose it is preferred to employ the same general conditions described above for catalytic hydrocracking, and catalysts of the same general nature described in connection with dehydrocyclization operations. Feedstocks include gasoline fractions, kerosenes, jet fuel fractions, diesel fractions, light and heavy gas oils, deasphalted crude oil residua and the like, any of which may contain up to about 5 wt. % of sulfur and up to about 3 wt. % of nitrogen.

The hydrocarbon conversion processes may be carried out in a batch, semi-continuous, or continuous fashion. The processes can be conducted in a single reaction zone or a number of reaction zones arranged in series or in parallel, or they may be conducted intermittently or continuously in an elongated tubular zone or a number of such zones. When multiple reaction zones are employed, it may be advantageous to employ one or more of such zeolite beta catalyst compositions in series to provide for a desired product mixture. Owing to the nature of the hydrocarbon conversion process, it may be desirous to carry out the certain processes by use of the zeolite beta catalyst compositions in a dynamic (e.g., fluidized or moving) bed system or any system of a variety of transport beds rather than in a fixed bed system. Such systems would readily provide for any regeneration (if required) of the zeolite beta catalyst compositions after a given period of time. If regeneration is required, the zeolite beta catalyst compositions can be continuously introduced as a moving bed to a regeneration zone where they can be regenerated, such as for example by removing carbonaceous materials by oxidation in an oxygen-containing atmosphere. In the preferred practice of some hydrocarbon conversion processes, the zeolite beta catalyst compositions will be subject to a regeneration step by burning off carbonaceous deposits accumulated during reactions.

Often, portions of the products from at least some of the hydrocarbon conversion processes outlined above are admixed in various proportions, as blending components, as well as with other blending components to form motor fuels such as gasoline. The details of such blending operations are well known to those in the refining industry and need not be further disclosed herein.

The following examples are illustrative of this invention.

EXAMPLE 1

5.8 grams (anhydrous weight) of sodium aluminate was added to 55.6 grams of 40% tetraethylammonium hydroxide (TEAOH) in a glass beaker and stirred at room temperature for a period of five minutes. The resulting mixture was heated with stirring to reflux and held for two minutes in order to dissolve the sodium aluminate. The resulting solution was pale yellow and the sodium aluminate was incompletely dissolved. The glass beaker was transferred to a cool stirring hot plate and cooled with stirring to room temperature. As the solution cooled, additional fine solids appeared in the solution which adhered to the bottom and sides of the glass beaker. The white solid was scraped from the sides of the glass beaker with a teflon spatula and stirred. Once the sodium aluminate/TEAOH solution was cooled, 145.4 grams of Ludox LS silica was added gradually. The resulting slurry became very thick and additional hand agitation with the teflon spatula was needed to maintain the mixing of the thickening gel. The gel was mixed on the magnetic stirrer for an additional ten minutes after all the Ludox LS silica had been added. The gel was divided in half and placed in separate teflon liners of about 93 grams and 105 grams respectively. Each teflon liner was placed in a stainless steel reactor and digested in an oven at a temperature of 150° C. After six days, the two reactors were removed from the oven and cooled overnight. The contents were combined and slurried with an additional 200 milliliters of deionized water and filtered. The solid product was washed with deionized water to a pH > 10. The product was dried at room temperature and, when examined by X-ray powder diffraction, gave the characteristic X-ray powder pattern of zeolite beta. The yield of zeolite beta product was approximately 50 grams. Analyzed properties of the zeolite beta product were as follows:

| | |
|---|---|
| $Na_2O$, wt. % | 0.47 |
| $(TEA)_2O$, wt. % | 18.27 |
| $(NH_4)_2O$, wt. % | — |
| $Al_2O_3$, wt. % | 6.38 |
| $SiO_2$, wt. % | 75.27 |
| $(TEA)_2O/Al_2O_3$ | 1.18 |
| $(NH_4)_2O/Al_2O_3$ | — |
| $SiO_2/Al_2O_3$ | 20.01 |

The zeolite beta product was then calcined in flowing air at a temperature of 600° C. for a period of 2 hours to decompose the tetraethylammonium cation. After cooling, the calcined zeolite beta product was exchanged with $NH_4NO_3$ solution (5 grams, $NH_4NO_3$ per gram of calcined zeolite beta product) at reflux (3 times), washed in distilled water and dried at room temperature. Analyzed properties of the calcined, ammonium-exchanged zeolite beta product were as follows:

| | |
|---|---|
| $Na_2O$, wt. % | <0.03 |
| $(TEA)_2O$, wt. % | — |
| $(NH_4)_2O$, wt. % | 2.69 |
| $Al_2O_3$, wt. % | 6.56 |
| $SiO_2$, wt. % | 89.46 |
| $(TEA)_2O/Al_2O_3$ | — |
| $(NH_4)_2O/Al_2O_3$ | 0.81 |
| $SiO_2/Al_2O_3$ | 23.15 |

EXAMPLES 2-11

The calcined, ammonium-exchanged zeolite beta product prepared in Example 1 was tested for n-butane cracking activity utilizing a cylindrical quartz tube reactor (254 millimeters in length and 10.3 millimeters internal diameter). Separate samples of the calcined, ammonium-exchanged zeolite beta product were tested for n-butane cracking activity. The reactor was loaded with 20-40 mesh (U.S. standard) particles of the calcined, ammonium-exchanged zeolite beta product in an amount of from 0.5 to 5 grams. The calcined ammonium-exchanged zeolite beta product was then activated in the reactor for a period of 1 hour in a stream of either flowing helium or flowing air at the activation temperature indicated in Table A. below. The reaction feedstock was a helium-n-butane mixture containing 2 mol. % n-butane and, after activation of the zeolite beta product, was passed through the reactor at a rate of 50 cubic centimeters per minute with the reactor temperature maintained at 500° C. Analysis of the feedstock and the reactor effluent was carried out using conventional gas chromatography techniques. The reactor effluent was analyzed after 10 minutes of on-stream operation. From the analytical data, a pseudo-first-order rate constant (kA) was calculated.

The results are given in Table A. The lower the value of kA, the lower the catalytic activity.

TABLE A

| Example No. | Activation Temperature (°C.) | | % Consumption of n-Butane | % i-Butane in Product | kA |
|---|---|---|---|---|---|
| 2 | 500 | Air | 91.3 | 0.4 | 126 |
| 3 | 500 | Helium | 88.4 | 1.1 | 128 |
| 4 | 550 | Air | 89.1 | 0.2 | 132 |
| 5 | 550 | Helium | — | — | — |
| 6 | 600 | Air | 93.1 | 0.1 | 184 |
| 7 | 600 | Helium | 93.3 | 0.1 | 170 |
| 8 | 650 | Air | 98.6 | 0.0 | 245 |
| 9 | 650 | Helium | 99.7 | 0.0 | 305 |
| 10 | 700 | Air | 82.2 | 0.0 | 60 |
| 11 | 700 | Helium | — | — | — |

FIG. 1 graphically illustrates the relationship between catalyst cracking activity for n-butane and catalyst air activation temperature in the process described in Examples 2-11. It can be seen that between the activation temperature range of about 575°-675° C., the kA, i.e., activity, was substantially enhanced over temperatures outside the range.

EXAMPLES 12-17

In order to demonstrate improved catalytic results from high temperature activation of zeolite beta in accordance with the invention, a series of n-butane cracking tests were conducted with LZ-202 for comparison purposes. LZ-202, an omega type zeolite synthesized in an organic free system, is a known active catalyst for hydrocarbon conversion reactions. LZ-202 is available from UOP, Des Plaines, Ill. Separate samples of ammonium-exchanged LZ-202 product were tested for n-butane cracking activity in accordance with the procedure described in Examples 2-11 above. The results are given in Table B below and show no unusual effect in regard to activity. Typically, a temperature of 550° C. in air is observed with most catalytic materials to be the optimum activation temperature for catalysis.

TABLE B

| Example No. | Activation Temperature (°C.) | | % Consumption of n-Butane | % i-Butane in Product | kA |
|---|---|---|---|---|---|
| 12 | 500 | Air | 76.8 | 4.1 | 71 |
| 13 | 500 | Helium | 82.1 | 3.5 | 57 |
| 14 | 550 | Air | 85.5 | 3.1 | 100 |
| 15 | 550 | Helium | 74.1 | 4.0 | 60 |
| 16 | 600 | Air | 62.5 | 4.6 | 56 |
| 17 | 600 | Helium | 56.0 | 5.0 | 37 |

EXAMPLE 18

51.74 grams (anhydrous weight) of sodium aluminate were added to 361.4 grams of 40% tetraethylammonium hydroxide (TEAOH) and mixed on a magnetic stirrer for a period of five minutes at room temperature before heating to reflux. The sodium aluminate did not completely dissolve. The resulting slurry was transferred to a plastic beaker and stirred with a Heidolph mixer fitted with a jiffy pain mix stirrer until it cooled. As the slurry cooled, additional precipitate formed. When cool, 945.1 grams of Ludox LS silica were gradually added with stirring to the sodium aluminate/TEAOH slurry. A very thick gel formed and additional hand agitation was needed to keep the slurry mixing. After all the Ludox LS silica had been added, the gel was mixed for a period of five minutes and it thinned slightly. 1295.5 grams of the gel were transferred to a two liter reactor and digested for a period of seven days at a temperature of 155° C. The reactor was then cooled overnight. Initial filtration was slow, but as the product was washed with deionized water, filtration became easier. After washing until the pH of the filtrate was less than 10, the solid product was dried at room temperature and fully characterized. This preparation had a yield of 350 grams. It had the characteristic X-ray powder pattern of zeolite beta. Analyzed properties of the zeolite beta product were as follows:

| | |
|---|---|
| $Na_2O$, wt. % | 0.86 |
| $(TEA)_2O$, wt. % | 15.72 |
| $(NH_4)_2O$, wt. % | — |
| $Al_2O_3$, wt. % | 6.16 |
| $SiO_2$, wt. % | 77.84 |
| $(TEA)_2O/Al_2O_3$ | 0.94 |
| $(NH_4)_2O/Al_2O_3$ | — |
| $SiO_2/Al_2O_3$ | 21.44 |

The zeolite beta product was then calcined in flowing air at a temperature of 600° C. for a period of 2 hours to decompose the tetraethylammonium cation. After cooling, the calcined zeolite beta product was exchanged with $NH_4NO_3$ solution (5 grams $NH_4NO_3$ per gram of calcined zeolite beta product) at reflux (3 times), washed in distilled water and dried at room temperature. Analyzed properties of the calcined, ammonium-exchanged zeolite beta product were as follows.

| | |
|---|---|
| $Na_2O$, wt. % | <0.03 |
| $(TEA)_2O$, wt. % | — |
| $(NH_4)_2O$, wt. % | 2.78 |
| $Al_2O_3$, wt. % | 6.03 |
| $SiO_2$, wt. % | 90.26 |
| $(TEA)_2O/Al_2O_3$ | — |
| $(NH_4)_2O/Al_2O_3$ | 0.90 |
| $SiO_2/Al_2O_3$ | 25.39 |

EXAMPLES 19-28

Separate samples of the calcined, ammonium-exchanged zeolite beta product prepared in Example 18 were tested for n-butane cracking activity in accordance with the procedure described in Examples 2-11 above. The results are given in Table C below.

TABLE C

| Example No. | Activation Temperature (°C.) | | % Consumption of n-Butane | % i-Butane in Product | kA |
|---|---|---|---|---|---|
| 19 | 500 | Air | 87.6 | 1.7 | 139 |
| 20 | 500 | Helium | 85.5 | 1.0 | 120 |
| 21 | 550 | Air | 85.2 | 0.5 | 123 |
| 22 | 550 | Helium | — | — | — |
| 23 | 600 | Air | 95.0 | 0.0 | 182 |
| 24 | 600 | Helium | 95.4 | 0.1 | 173 |

TABLE C-continued

| Example No. | Activation Temperature (°C.) | % Consumption of n-Butane | % i-Butane in Product | kA |
|---|---|---|---|---|
| 25 | 650 Air | 98.1 | 0.0 | 210 |
| 26 | 650 Helium | 97.6 | 0.0 | 230 |
| 27 | 700 Air | 65.1 | 0.4 | 71 |
| 28 | 700 Helium | — | — | — |

In order to demonstrate the unique nature of this invention, the following Examples 29-36 were conducted wherein one or more of the required catalyst preparation steps were omitted, i.e., calcination, ion-exchange and/or activation.

EXAMPLES 29-32

A zeolite beta product was prepared in accordance with the procedure described in Example 18 above except without the final activating step and without the ammonium exchange step. The zeolite beta product was tested for n-butane cracking activity in accordance with the procedure described in Examples 2-11 above. The results are given in Table D below. The results demonstrate inferior activity of this zeolite beta product in comparison with zeolite beta product prepared according to this invention and further demonstrate the importance of the required catalyst preparation step.

TABLE D

| Example No. | Calcination Temperature (°C.) | % Consumption of n-Butane | % i-Butane in Product | kA |
|---|---|---|---|---|
| 29 | 550 Air | 23.5 | 6.9 | 22 |
| 30 | 600 Air | 44.8 | 2.3 | 63 |
| 31 | 650 Air | 33.9 | 3.6 | 43 |
| 32 | 700 Air | 46.6 | 1.2 | 43 |

EXAMPLE 33

A zeolite beta product was prepared in accordance with the procedure described in Example 18 above except without the initial calcination step to oxidize the catalyst templating agent. The zeolite beta product was ammonium-exchanged and activated at a temperature of 550° C. in air and thereafter tested for n-butane cracking activity in accordance with the procedure described in Examples 2-11 above. The results are given in Table E below. The results demonstrate inferior activity of this zeolite beta product in comparison with zeolite beta product prepared according to this invention and further demonstrate the importance of the required catalyst preparation steps.

TABLE E

| Example No. | Activation Temperature (°C.) | % Consumption of n-Butane | % i-Butane in Product | kA |
|---|---|---|---|---|
| 33 | 550 Air | 50.2 | 3.7 | 67 |

EXAMPLE 34

A zeolite beta product was prepared in accordance with the procedure described in Example 18 above except without the ammonium exchange step. Instead, the zeolite beta product was hydronium ion-exchanged after the initial calcination step. The zeolite beta product was tested for n-butane cracking activity in accordance with the procedure described in Examples 2-11 above. The results are given in Table F below. The results demonstrate that hydronium-exchanged zeolite beta results in inferior activity in comparison with ammonium-exchanged zeolite beta.

TABLE F

| Example No. | Activation Temperature (°C.) | % Consumption of n-Butane | % i-Butane in Product | kA |
|---|---|---|---|---|
| 34 | 550 Air | 3.5 | 2.1 | 4 |

EXAMPLES 35-36

A zeolite beta product was prepared in accordance with the procedure described in Example 18 above except the zeolite beta product was hydrothermally treated with steam at a temperature of 600° C. following the ammonium exchange step. The product resulting from the steaming was fully crystalline. The zeolite beta product was then activated at a temperature of 650° C. and thereafter tested for n-butane cracking activity in accordance with the procedure described in Examples 2-11 above. The results are given in Table G below. The results demonstrate that hydrothermal steam calcination or activation of zeolite beta product results in inferior activity in comparison with thermal calcination or activation by heating in air or an inert atmosphere.

TABLE G

| Example No. | Activation Temperature (°C.) | % Consumption of n-Butane | % i-Butane in Product | kA |
|---|---|---|---|---|
| 35 | 650 Helium | 2.8 | 21.1 | 2 |
| 36 | 650 Helium | 5.1 | 18.8 | 3 |

EXAMPLE 37

51.74 grams (anhydrous weight) of sodium aluminate were added to 361.4 grams of 40% tetraethylammonium hydroxide (TEAOH) and mixed on a magnetic stirrer for a period of five minutes at room temperature before heating to reflux. The sodium aluminate did not completely dissolve. The resulting slurry was transferred to a plastic beaker and stirred with a Heidolph mixer fitted with a jiffy paint mix stirrer until it cooled. As the slurry cooled, additional precipitate formed. When cool, 945.1 grams of Ludox LS silica were gradually added with stirring to the sodium aluminate/TEAOH slurry. A very thick gel formed and additional hand agitation was needed to keep the slurry mixing. After all the Ludox LS silica had been added, the gel was mixed for a period of five minutes and it thinned slightly. 1295.5 grams of the gel were transferred to a two liter reactor and digested for a period of seven days at a temperature of 155° C. The reactor was then cooled overnight. Initial filtration was slow, but as the product was washed with deionized water, filtration became easier. After washing until the pH of the filtrate was less than 10, the solid product was dried at room temperature and fully characterized. This preparation had a yield of 350 grams. It had the characteristic X-ray powder pattern of zeolite beta. Analyzed properties of the zeolite beta product were as follows:

| | |
|---|---|
| $Na_2O$, wt. % | 0.86 |
| $(TEA)_2O$, wt. % | 15.72 |
| $(NH_4)_2O$, wt. % | — |
| $Al_2O_3$, wt. % | 6.16 |
| $SiO_2$, wt. % | 77.84 |

| (TEA)₂O/Al₂O₃ | 0.94 |
| (NH₄)₂O/Al₂O₃ | — |
| SiO₂/Al₂O₃ | 21.44 |

The zeolite beta product was then calcined in flowing air at a temperature of 600° C. for a period of 2 hours to decompose the tetraethylammonium cation. After cooling, the calcined zeolite beta product was exchanged with NH₄NO₃ solution (5 grams NH₄NO₃ per gram of calcined zeolite beta product) at reflux (3 times), washed in distilled water and dried at room temperature. Analyzed properties of the calcined, ammonium-exchanged zeolite beta product were as follows:

| Na₂O, wt. % | <0.03 |
| (TEA)₂O, wt. % | — |
| (NH₄)₂O, wt. % | 2.78 |
| Al₂O₃, wt. % | 6.03 |
| SiO₂, wt. % | 90.26 |
| (TEA)₂O/Al₂O₃ | — |
| (NH₄)₂O/Al₂O₃ | 0.90 |
| SiO₂/Al₂O₃ | 25.39 |

EXAMPLE 38

100 grams of calcined, ammonium-exchanged zeolite beta product prepared as in Example 37 were slurried in a beaker in one liter of distilled water. A second solution containing 0.60 grams of Pt(NH₃)₄Cl₂ dissolved in 500 milliliters of distilled water was then added to the zeolite slurry and the zeolite beta was platinum-exchanged. The resulting slurry was then filtered and washed with distilled water, dried, extruded with peptized alumina binder and dried again for a period of sixteen hours. The extrudates contained 0.32 wt. % platinum. The extrudates were split into two batches, one batch was calcined in air at a maximum temperature of 650° C. (hereinafter Catalyst A) and the second batch was calcined in air at a maximum temperature of 540° C. (hereinafter Catalyst B).

EXAMPLE 39

Separate samples of Catalyst A and Catalyst B prepared in Example 38 above were evaluated for C₅/C₆ isomerization activity using a fixed bed microreactor unit comprising a stainless steel tube (⅜-inch internal diameter). About 8.0 to 12.0 grams of selected Catalyst A or Catalyst B (40×60 mesh, U.S. Standard) were loaded in the microreactor and reduced under a flow of hydrogen gas at a temperature of greater than 200° C. for a period of sixteen hours. A feed consisting of 60 wt. % n-C₅, 35 wt. % n-C₆ and 5 wt. % cyclohexane was then introduced into the microreactor at a reaction pressure of 250 psig, a weight hourly space velocity (WHSV) of 1.6 hr.⁻¹, a hydrogen/hydrocarbon feed molar ratio of 2 and a reaction temperature specified in Table H below. Products were collected at selected run times and the products were analyzed by gas chromatography. The products were evaluated in several respects by determining:

$$\text{i-C}_5 \text{ Conversion} = \frac{\text{i-C}_5}{\text{i-C}_5 + \text{n-C}_5}$$

$$\text{2,2-DMB(Dimethylbutane) Conversion} = \frac{\text{2,2-DMB}}{\text{Total C}_6 \text{ Paraffins}}$$

as a means to determine the relative extent of conversion of pentane and hexane to isomeric products. The results are set forth in Table H below.

TABLE H

| Catalyst | Reaction Temperature (°C.) | i-C₅ Conversion | 2,2-DMB Conversion | C₅+ Yield |
|---|---|---|---|---|
| A | 251.7 | 62.9 | 18.1 | 98.5 |
| A | 260.0 | 68.1 | 19.0 | 97.3 |
| A | 265.6 | 69.2 | 19.2 | 95.7 |
| A | 273.9 | 69.1 | 19.0 | 92.4 |
| B | 251.7 | 55.7 | 13.5 | 98.9 |
| B | 260.0 | 63.1 | 15.1 | 97.8 |
| B | 265.6 | 66.5 | 16.1 | 96.5 |
| B | 273.9 | 68.9 | 18.0 | 93.7 |

The results set forth in Table H above are graphically illustrated in FIG. 2 and FIG. 3.

FIG. 2 graphically illustrates the relationship between C₅ isomerization conversion and C₅+ yield as demonstrated by the isomerization process described in Example 39, in particular, the relationship between wt. % i-C₅ of total C₅ paraffins and the wt. % C₅+ yield, utilizing a zeolite beta catalyst activated at a temperature of 650° C., a zeolite beta catalyst activated at a temperature of 540° C. and a standard reference catalyst as identified in Example 39.

FIG. 3 graphically illustrates the relationship between C₆ isomerization conversion and C₅+ yield as demonstrated by the isomerization process described in Example 39, in particular, the relationship between wt. % 2,2-DMB (dimethylbutane) of total C₆ paraffins and the wt. % C₅+ yield, utilizing a zeolite beta catalyst activated at a temperature of 650° C., a zeolite beta catalyst activated at a temperature of 540° C. and a standard reference catalyst as identified below.

It can be seen from FIGS. 2 and 3 that both the catalytic activity, i.e., conversion, and selectivity, i.e., yield, were substantially enhanced when the catalyst was activated at 650° C. as compared to 540° C. The delta i-C₅ conversion, delta 2,2-DMB conversion and delta RON (Research Octane Number) based on a standard reference catalyst were calculated at 96% C₅+ yield using a 60:40 wt. % n-C₅: n-C₆ feed composition as follows:

delta i-C₅ Conversion = i-C₅ conversion − 63.00 delta 2,2-DMB Conversion = 2,2-DMB conversion − 17.00 delta $RON$ = 0.60 × 0.33 (i-C₅ conversion − 63.00) +

0.40 × 0.65 (2,2-DMB conversion − 17.00)

The standard reference catalyst was HS-10, a platinum on H-mordenite catalyst available from Shell Oil Company, La Hague, Netherlands, having an i-C₅ conversion of 63% and a 2,2-DMB conversion of 17%. In the formula; 0.60 and 0.40 denote the n-pentane and n-hexane composition of the feed in weight fraction, 0.33 denotes the RON octane difference between isopentane (RON=94) and normal pentane (RON=71) divided by 100, and 0.65 denotes the octane difference between 22DMB (RON=94) and n-hexane (RON=29) divided by 100. The results are set forth in Table I below as follows:

TABLE I

| Catalyst | delta i-C$_5$ Conversion | delta 2-2-DMB Conversion | Delta RON |
|---|---|---|---|
| A | 6.25 | 2.25 | 1.82 |
| B | 4.40 | −0.39 | 0.80 |
| HS-10 | 0.0 | 0.0 | 0.0 |

The results from Table I show superior catalytic performance of zeolite beta activated at a temperature of 650° C. in a C$_5$/C$_6$ isomerization process in comparison with the catalytic performance of the same catalyst activated at a temperature of 540° C., the typical activation temperature.

Although the invention has been illustrated by the preceding examples, it is not to be construed as being limited thereby; but rather, the invention encompasses the generic area as hereinbefore disclosed. Various modifications and embodiments can be made without departing from the spirit and scope thereof. Accordingly, the Examples demonstrate various ways in which the method of the present invention can provide a zeolite beta-containing catalyst that can have at least one enhanced catalytic property, e.g., reactivity, i.e., activity or selectivity.

We claim:

1. A method for enhancing at least one catalytic property of a crystalline microporous three-dimensional solid catalyst having the structure and composition of zeolite beta for use in a hydrocarbon conversion process, said catalyst having previously been calcined and subjected to ion-exchange with a hydrogen-forming cation, said method comprising; activating said catalyst by heating in air or an inert atmosphere at a temperature from about 600°-675° C. and for a period of time sufficient to enhance at least one catalytic property of the catalyst in the hydrocarbon conversion process.

2. The method of claim 1 which comprises activating said catalyst at a temperature of from about 625° to about 675° C.

3. The method of claim 1 which comprises activating said catalyst at a temperature of from about 640° to about 660° C.

4. The method of claim 1 which comprises activating said catalyst at a temperature of about 650° C.

5. The method of claim 1 which comprises activating said catalyst for a period of time in excess of about 0.25 hours.

6. The method of claim 1 which comprises activating said catalyst for a period of time in excess of about 0.50 hours.

7. A method for enhancing at least one catalytic property of a crystalline microporous three-dimensional solid catalyst having the structure and composition of zeolite beta for use in a hydrocarbon conversion process, said catalyst having previously been calcined, said method comprising:

(a) ion-exchanging said catalyst with a salt solution containing at least one hydrogen-forming cation other than hydronium; and (b) activating said catalyst by heating in air or an inert atmosphere at a temperature of from about 600°-675° C. and for a period of time sufficient to enhance at least one catalytic property of the catalyst in said hydrocarbon conversion process.

8. The method of claim 7 wherein said calcined catalyst is prepared by heating an as-synthesized zeolite beta-containing catalyst in air or an inert atmosphere at a temperature and for a period of time sufficient to oxidize at least a substantial portion of a catalyst templating agent initially present on said as-synthesized catalyst to provide said calcined catalyst.

9. The method of claim 8 which comprises calcining said catalyst at a temperature of from about 200° to about 1000° C.

10. The method of claim 8 which comprises calcining said catalyst at a temperature of from about 600° to about 650° C.

11. The method of claim 8 which comprises calcining said catalyst for a period of time in excess of about 0.25 hours.

12. The method of claim 7 which comprises ion-exchanging said catalyst in step (a) with a salt solution containing at least one hydrogen-forming cation selected from NH$_4^+$ and quaternary ammonium.

13. The method of claim 7 which comprises activating said catalyst in step (b) at a temperature of from about 625° to about 675° C.

14. The method of claim 13 which comprises activating said catalyst in step (b) at a temperature of from about 640° to about 660° C.

15. The method of claim 14 which comprises activating said catalyst in step (b) at a temperature of about 650° C.

16. The method of claim 7 in which said catalyst is treated prior to activating with an effective amount of at least one metal cation selected from Group IIA, Groups IIIB to VIIB, cerium, lanthanum, praseodymium, neodymium, promethium, samarium, europium, gadolinium, terbium, dysprosium, holmium, erbium, thulium, ytterbium, lutetium and mixtures thereof.

17. The method of claim 7 in which said catalyst is ammonium-exchanged and platinum-exchanged.

18. The method of claim 16 in which said catalyst contains between about 0.05 and about 20 wt. % of said metal cation.

19. The method of claim 18 in which said catalyst contains between about 0.5 and about 10 wt. % of said metal cation.

20. The method of claim 7 in which said catalyst is admixed prior to activating in step (b) with at least one inorganic oxide matrix component.

21. The method of claim 20 in which said catalyst comprises between about 5 and about 95% by weight of at least one inorganic oxide matrix component selected from clays, silicas, aluminas, silica-aluminas, silica-zirconias, silica-magnesias, alumina-borias and alumina-titanias.

22. In a method for enhancing at least one catalytic property of a crystalline microporous three-dimensional solid catalyst having the structure and composition of zeolite beta for use in a hydrocarbon conversion process, said catalyst having previously been subjected to calcination by heating in air or an inert atmosphere at a temperature and for a period of time sufficient to oxidize at least a substantial portion of a catalyst templating agent initially present on said catalyst, said method comprising the steps of:

(1) ion-exchanging said catalyst with a salt solution containing at least one hydrogen-forming cation other than hydronium; and (2) activating said catalyst by heating in air or an inert atmosphere;

the improvement which comprises: activating said catalyst in step (2) at a temperature of from about 600° to about 675° C.

23. The method of claim 22 which comprises activating said catalyst in step (2) at a temperature of from about 625° to about 675° C.

24. The method of claim 23 which comprises activating said catalyst in step (2) at a temperature of from about 640° to about 660° C.

25. The method of claim 24 which comprises activating said catalyst in step (2) at a temperature of about 650° C.

26. The method of claim 22 which comprises activating said catalyst in step (2) for a period of time in excess of about 0.25 hours.

* * * * *